US010262229B1

United States Patent
Rao et al.

(10) Patent No.: US 10,262,229 B1
(45) Date of Patent: Apr. 16, 2019

(54) WIDE-AREA SALIENT OBJECT DETECTION ARCHITECTURE FOR LOW POWER HARDWARE PLATFORMS

(71) Applicant: HRL Laboratories, LLC, Malibu, CA (US)

(72) Inventors: Shankar R. Rao, Agoura Hills, CA (US); Narayan Srinivasa, Portland, OR (US)

(73) Assignee: HRL Laboratories, LLC, Malibu, CA (US)

( * ) Notice: Subject to any disclaimer, the term of this patent is extended or adjusted under 35 U.S.C. 154(b) by 206 days.

(21) Appl. No.: 15/272,247

(22) Filed: Sep. 21, 2016

Related U.S. Application Data

(63) Continuation-in-part of application No. 15/203,596, filed on Jul. 6, 2016, now Pat. No. 9,998,130, and a
(Continued)

(51) Int. Cl.
*G06K 9/46* (2006.01)
*G06T 7/00* (2017.01)
(Continued)

(52) U.S. Cl.
CPC .............. *G06K 9/4676* (2013.01); *G06T 3/40* (2013.01); *G06T 7/0081* (2013.01); *G06T 7/11* (2017.01); *G06T 2207/10004* (2013.01)

(58) Field of Classification Search
CPC ...... G06K 9/4671; G06K 9/4676; G06T 7/11; G06T 7/0081; G06T 3/40; G06T 2207/10004
See application file for complete search history.

(56) References Cited

U.S. PATENT DOCUMENTS 5,355,435 A  10/1994 DeYong et al.
6,272,247 B1  8/2001 Manickam et al.
(Continued)

FOREIGN PATENT DOCUMENTS

JP  2012-234393  11/2012
WO  WO 2014/011907  1/2014

OTHER PUBLICATIONS

International Search Report and Written Opinion of the International Searching Authority for PCT/US2016/017895; dated Dec. 16, 2016.
(Continued)

*Primary Examiner* — Kenny A Cese
(74) *Attorney, Agent, or Firm* — Tope-McKay & Associates

(57) ABSTRACT

Described is a system for detecting multiple salient objects in an image using low power hardware. From consecutive pair of image frames of a set of input image frames, image channels are generated. The image channels are resized into multiple image scales that specify a relative size of a salient object in the image frames. A patch-based spectral transform is applied to overlapping image patches in the resized image channel, generating salient patches. Saliency patches are combined into a saliency map for each resized image channel, resulting in multiple saliency maps. The saliency maps are combined into an aggregate saliency map. An adaptive threshold is applied to the aggregate saliency map to determine which pixels in the aggregate saliency map correspond to a detected salient object region including a salient object. An object bounding box is generated for each salient object and output to a display.

22 Claims, 14 Drawing Sheets

Related U.S. Application Data continuation-in-part of application No. 15/079,899, filed on Mar. 24, 2016, and a continuation-in-part of application No. 15/043,478, filed on Feb. 12, 2016, now Pat. No. 9,721,332.

(60) Provisional application No. 62/221,550, filed on Sep. 21, 2015, provisional application No. 62/155,355, filed on Apr. 30, 2015, provisional application No. 62/137,665, filed on Mar. 24, 2015.

(51) Int. Cl.
*G06T 3/40* (2006.01)
*G06T 7/11* (2017.01)

(56) References Cited

U.S. PATENT DOCUMENTS

| | | |
|---|---|---|
| 7,403,144 B1 | 7/2008 | Cruz-Albrecht et al. |
| 7,822,698 B1 | 10/2010 | Cruz-Albrecht et al. |
| 8,996,431 B2 | 3/2015 | Cruz-Albrecht et al. |
| 9,262,843 B1 | 2/2016 | Cruz-Albrecht et al. |
| 9,286,268 B2 | 3/2016 | Seeman |
| 9,721,332 B2 | 8/2017 | Cruz-Albrecht |
| 2002/0038294 A1 | 3/2002 | Matsugu |
| 2009/0129696 A1 | 5/2009 | Komatsu et al. |
| 2009/0132467 A1 | 5/2009 | Blewett et al. |
| 2010/0257129 A1 | 10/2010 | Lyon et al. |
| 2013/0129188 A1* | 5/2013 | Zhang ............ G06T 7/0008 382/144 |
| 2014/0205206 A1* | 7/2014 | Datar ............ G06T 3/0012 382/298 |
| 2014/0219579 A1 | 8/2014 | Lischinski et al. |
| 2014/0254922 A1* | 9/2014 | Wang ............ G06K 9/4671 382/159 |
| 2015/0012800 A1 | 1/2015 | Yang et al. |
| 2015/0117784 A1* | 4/2015 | Lin ............ G06K 9/4671 382/195 |
| 2015/0310303 A1* | 10/2015 | Andreopoulos ..... G06K 9/4676 382/158 |

OTHER PUBLICATIONS

Notice Of Allowance for U.S. Appl. No. 15/043,478, dated Mar. 27, 2017.
Pierre Sermanet, David Eigen, Xiang Zhang, Michael Mathieu, Rob Fergus and Yann LeCun: OverFeat: Integrated Recognition, Localization and Detection using Convolutional Networks, International Conference on Learning Representations (ICLR2014), CBLS, Feb. 24, 2014, pp. 1-16.
Serre, T., Oliva, A., & Poggio, T. (2007). A feedforward architecture accounts for rapid categorization. Proceedings of the National Academy of Sciences, 104(15), pp. 6424-6429.
Hoehfeld, M., & Fahlman, S. E. (1992). Learning with Limited Numerical Precision Using the Cascade-Correlation Learning Algorithm. IEEE Transactions on Neural Networks, 3(4), pp. 602-611.
R. Kasturi, D. Goldgof, P. Soundararajan, V. Manohar, J. Garofalo, R. Bowers, M. Boonstra, V. Korzhova, and J. Zhang, "Framework for Performance Evaluation of Face, Text, and Vehicle Detection and Tracking in Video: Data, Metrics, and Protocol," IEEE Transactions on Pattern Analysis and Machine Intelligence, vol. 31, No. 2, Feb. 2009, pp. 319-336.
International Search Report of the International Searching Authority for PCT/US2016/024017; dated Jul. 6, 2016.
The Written Opinion of the International Searching Authority for PCT/US2016/024017; dated Jul. 6, 2016.
Notification of Transmittal of International Search Report and the Written Opinion of the International Searching Authority for PCT/U52016/024017; dated Jul. 6, 2016.
Roberto Rigamonti et al., "Are sparse representations really relevant for image classification?", Computer Vision and Pattern Recognition (CVPR), 2011 IEEE Conference on, In: IEEE, Jun. 25, 2011, pp. 1545-1552.
Shibata, T., Zhang, R., Levitan, S. P., Nikonov, D. E., & Bourianoff, G. I. (2012). CMOS supporting circuitries for nano-oscillator-based associative memories. In 2012 13th International Workshop on Cellular Nanoscale Networks and Their Applications (CNNA), pp. 1-5.
Levitan, S.P. et al., "Non-Boolean Associative Architectures Based on Nano-Oscillators," Proc. Intl. Workshop on Cellular Nanoscale Networks and their Applications, 2012, pp. 1-6.
Levitan, S. P., Fang, Y., Carpenter, J. A., Gnegy, C. N., Janosik, N. S., Awosika-Olumo, S., . . . & Porod, W. (2013). Associative processing with coupled oscillators. In ISPLED, p. 235.
Sermanet, P., Eigen, D., Zhang, X., Mathieu, M., Fergus, R., & LeCun, Y. (2014). Overfeat: Integrated recognition, localization and detection using convolutional networks. In International Conference on Learning Representations (ICLR 2014), Apr. 2014, pp. 1-16.
Krizhevsky, A., Sutskever, I., & Hinton, G. E. (2012). Imagenet classification with deep convolutional neural networks. In Advances in neural information processing systems, pp. 1097-1105.
Fang, et al., "Modeling oscillator arrays for video analytic applications," IEEE/ACM International Conference on Computer-Aided Design (ICCAD), 2014, pp. 86-91.
Jennings, et al., "HMAX Image Processing Pipeline with Coupled Oscillator Acceleration," IEEE Workshop on Signal Processing Systems (SiPS), 2014, pp. 1-22.
D. Chiarulli, B. Jennings, Y. Fang, A. Seel, and S. Levitan, "A Computational Primitive for Convolution based on Coupled Oscillator Arrays," in Proc. of ISVLSI, No. 144, pp. 125-130, 2015.
From U.S. Appl. No. 14/202,200 (now U.S. Pat. No. 9,262,843), Notice of Allowance dated Oct. 6, 2015.
A. Fasih, J. Chedjou, and K. Kyamakya, "Ultra Fast Object Counting Based on Cellular Neural Network," in Proc. of INDS, 2008, pp. 1-3.
C. Guo, Q. Ma, and L. Zhang, "Spatio-temporal Saliency detection using phase spectrum of quaternion fourier transform," in Proc. of CVPR, 2008, pp. 1-8.
H.O. Kunz, "On the Equivalence Between One-Dimensional Discrete Walsh-Hadamard and Multidimensional Discrete Fourier Transforms," IEEE Transactions on Computers, 28 (3): pp. 267-268, 1979.
X. Hou and L. Zhang, "Saliency Detection: A Spectral Residual Approach," in Proc. of CVPR, 2007, pp. 1-8.
X. Hou, and C. Koch, "Image Signature: Highlighting Sparse Salient Regions", IEEE TPAMI, 30(1): pp. 194-201, 2012.
L. Itti, C. Koch, and E. Niebur, "A model of saliency-based visual attention for rapid scene analysis," IEEE TPAMI 20 (11): pp. 1254-1259, 1998.
S. Levitan, Y. Fang, D. Dash, T. Shibata, D. Nikonov, and G. Bourianoff, "Non-Boolean associative architectures based on nano-oscillators," Proc. of CNNA, 2012, pp. 1-6.
D. Lowe, "Distinctive image features from scale-invariant keypoints," IJCV, 60(2), pp. 91-110, 2004.
J. Mutch, and D. Lowe, "Multiclass Object Recognition with Sparse, Localized Features," in Proc. of CVPR, 2006, pp. 1-8.
M., Riesenhuber, and T. Poggio, "Hierarchical Models of Object Recognition in Cortex," Nature Neuroscience 2: pp. 1019-1025, 1999.
B. Schauerte and R. Stiefelhagen, "Quaternion-Based Spectral Saliency Detection for Eye Fixation Prediction," in Proc. of ECCV, 2012, pp. 116-129.
L., Itti, "Neovision2 annotated video datasets," Stanford Hoover Tower images from the DARPA Neovision2 data-set available at h t t p : / / ilab.usc.edu/neo2/dataset/. Downloaded Nov. 17, 2016.
R. Walczyk, A. Armitage, and T. Binnie, "Comparative Study of Connected Component Labeling Algorithms for Embedding Video Processing Systems," in Proc. of IPCV, 2010, pp. 107.
Y. Yu, J. Lin, and J. Yang, "Bottom-Up Visual Saliency Using Binary Spectrum of Walsh-Hadamard Transform," in Proc. of ICONIP, 2014, pp. 33-41.
"Hadamard transform", http://en.wikipedia.org/wiki/Hadamard_transform. Downloaded Nov. 17, 2016.

(56) References Cited

OTHER PUBLICATIONS

Notice Of Allowance for U.S. Appl. No. 15/203,596 (not TMA), dated Feb. 13, 2018.
Narayanan, et al., "Video Analytics Using Beyond CMOS Devices," In: Proceedings of the conference on 2014 Design, Automation & Test in Europe, European Design and Automation Association, Mar. 24-28, 2014.
Nikonov, et al., "Convolutional Networks for Image Processing by Coupled Oscillator Arrays," pp. 1-23, Sep. 15, 2014.
From: PCT/US2017/040779I International Search Report and Written Opinion, dated Oct. 19, 2017.
Notification Concerning Transmittal of International Preliminary Report on Patentability for PCT/US2016/024017; dated Oct. 5, 2017.
International Preliminary Report on Patentability for PCT/US2016/024017; dated Oct. 5, 2017.
Response for European Regional Phase Patent Application No. 16769696.2; dated Apr. 30, 2018.

* cited by examiner

Whole Image, 4x downsampling

|  | Ground Truth | #Hits | #Misses | Avg./Med. Ov. Ratio |
|---|---|---|---|---|
| Car | 3869 | 3869 | 0 | 0.767/0.786 |
| Truck | 49 | 46 | 3 | 0.399/0.300 |
| Bus | 153 | 139 | 14 | 0.548/0.484 |
| Person | 6716 | 3147 | 3569 | 0.303/0.315 |
| Cyclist | 3101 | 2529 | 572 | 0.534/0.625 |
| Total | 13888 | 9730 | 4158 | 0.491/0.578 | of False detections: 41195

FIG. 5A

64x64 patches, 4x downsampling

| | Ground Truth | #Hits | #Misses | Avg./Med. Ov. Ratio |
|---|---|---|---|---|
| Car | 3869 | 1217 | 2652 | 0.180/0.172 |
| Truck | 49 | 9 | 40 | 0.165/0.101 |
| Bus | 153 | 17 | 136 | 0.108/0.079 |
| Person | 6716 | 3519 | 3197 | 0.308/0.340 |
| Cyclist | 3101 | 2843 | 258 | 0.520/0.544 |
| Total | 13888 | 7605 | 6283 | 0.315/0.274 | of False detections: 42343

FIG. 5B

Whole Image, 16x downsampling

| | Ground Truth | #Hits | #Misses | Avg./Med. Ov. Ratio |
|---|---|---|---|---|
| Car | 3869 | 3679 | 190 | 0.404/0.353 |
| Truck | 49 | 48 | 1 | 0.521/0.576 |
| Bus | 153 | 148 | 5 | 0.598/0.647 |
| Person | 6716 | 727 | 5989 | 0.073/0.030 |
| Cyclist | 3101 | 2094 | 1007 | 0.299/0.344 |
| Total | 13888 | 6696 | 7192 | 0.229/0.203 | of False detections: 7208

FIG. 5C

WHT (patch-based, no quantization)

|         | Ground Truth | #Hits | #Misses | Avg./Med. Ov. Ratio |
|---------|--------------|-------|---------|---------------------|
| Car     | 3869         | 3829  | 40      | 0.560/0.513         |
| Truck   | 49           | 42    | 7       | 0.453/0.524         |
| Bus     | 153          | 118   | 35      | 0.430/0.462         |
| Person  | 6716         | 3736  | 2980    | 0.307/0.301         |
| Cyclist | 3101         | 2749  | 352     | 0.475/0.516         |
| Total   | 13888        | 10474 | 3414    | 0.418/0.484         | of False detections: 41967

FIG. 8A

DCT (patch-based, no quantization)

|  | Ground Truth | #Hits | #Misses | Avg./Med. Ov. Ratio |
|---|---|---|---|---|
| Car | 3869 | 3869 | 0 | 0.729/0.767 |
| Truck | 49 | 43 | 6 | 0.486/0.553 |
| Bus | 153 | 129 | 24 | 0.436/0.460 |
| Person | 6716 | 3874 | 2842 | 0.320/0.309 |
| Cyclist | 3101 | 2830 | 271 | 0.489/0.521 |
| Total | 13888 | 10745 | 3143 | 0.475/0.524 | of False detections: 37267

FIG. 8B

Case 1: No salient neighbors → Create a new label

Case 2: Salient neighbors all have same label → Assign that label to pixel

Case 3: Salient neighbors have different labels → Assign smallest label to pixel, mark other labels "to be merged"

No Quantization

| | Ground Truth | #Hits | #Misses | Avg./Med. Ov. Ratio |
|---|---|---|---|---|
| Car | 3869 | 3829 | 40 | 0.560/0.513 |
| Truck | 49 | 42 | 7 | 0.453/0.524 |
| Bus | 153 | 118 | 35 | 0.430/0.462 |
| Person | 6716 | 3736 | 2980 | 0.307/0.301 |
| Cyclist | 3101 | 2749 | 352 | 0.475/0.516 |
| Total | 13888 | 10474 | 3414 | 0.418/0.484 | of False detections: 41967

FIG. 10A

5 bits quantization (10 in saliency module)

| | Ground Truth | #Hits | #Misses | Avg./Med. Ov. Ratio |
|---|---|---|---|---|
| Car | 3869 | 3734 | 135 | 0.495/0.499 |
| Truck | 49 | 41 | 8 | 0.455/0.548 |
| Bus | 153 | 114 | 39 | 0.377/0.346 |
| Person | 6716 | 3373 | 3343 | 0.280/0.266 |
| Cyclist | 3101 | 2594 | 507 | 0.448/0.510 |
| Total | 13888 | 9856 | 4032 | 0.381/0.441 | of False detections: 26858

FIG. 10B

WIDE-AREA SALIENT OBJECT DETECTION ARCHITECTURE FOR LOW POWER HARDWARE PLATFORMS

CROSS-REFERENCE TO RELATED APPLICATIONS

This is a Continuation-in-Part application of U.S. application Ser. No. 15/079,899, filed in the United States on Mar. 24, 2016, entitled, "Sparse Inference Modules for Deep Learning," which is a Non-Provisional application of U.S. Provisional Application No. 62/137,665, filed in the United States on Mar. 24, 2015, entitled, "Sparse Inference Modules for Deep Learning," which are incorporated herein by reference in their entirety. U.S. application Ser. No. 15/079,899 is also a Non-Provisional application of U.S. Provisional Application No. 62/155,355, filed in the United States on Apr. 30, 2015, entitled, "Sparse Inference Modules for Deep Learning," which is incorporated herein by reference in its entirety.

This is ALSO a Continuation-in-Part application of U.S. application Ser. No. 15/043,478, filed in the United States on Feb. 12, 2016, entitled, "Spike Domain Convolution Circuit," which is incorporated herein by reference in its entirety.

This is ALSO a Continuation-in-Part application of U.S. application Ser. No. 15/203,596, filed in the United States on Jul. 6, 2016, entitled, "Method to Perform Convolutions between Arbitrary Vectors Using Clusters of Weakly Coupled Oscillators," which is incorporated herein by reference in its entirety.

This is ALSO a Non-Provisional application of U.S. Provisional Application No. 62/221,550, filed in the United States on Sep. 21, 2015, entitled, "Wide-Area Salient Object Detection Architecture for Low Power Hardware Platforms," which is incorporated herein by reference in its entirety.

GOVERNMENT LICENSE RIGHTS

This invention was made with government support under U.S. Government Contract Number HR0011-13-C-0052. The government has certain rights in the invention.

BACKGROUND OF INVENTION

(1) Field of Invention

The present invention relates to a system for salient object detection and, more particularly, to a system for salient object detection that can be implemented in efficient hardware.

(2) Description of Related Art

Methods for salient object detection in images video can be roughly grouped into two categories: bio-inspired computer vision-base approaches and spectral saliency approaches. Bio-inspired computer vision-based approaches, such as those described in Literature Reference Nos. 7, 10, and 11 in the List of Incorporated Literature References and successor approaches, extract sparse features inspired by the human perception system (e.g., edges/boundaries, corners) and send them through a hierarchy roughly modeled on the human visual cortex. The hierarchy provides invariance to scale, color, motion, orientations, and other nuisances. While such approaches are believed to be a reasonable model of human pre-attentive visual perception, they have many parameters that must be tuned, and, as a result, the qualitative performance (in human pre-attentive eye fixation prediction) is not as high as competing approaches.

Spectral saliency approaches, such as those described in Literature Reference Nos. 3, 5, 6, 12, and 15, leverage the fact that in spectral transform domain, such as Fourier, salient object boundaries that do not correspond to smooth regions or periodic boundary have a unique signature that can be detected by applying a log-magnitude, phase, or sign of the spectrum. Such methods are simple and reasonably computationally efficient in software (being based on the Fast Fourier Transform), and require no training and very little parameter tuning.

The prior approaches described above have shortcomings that limit their implementation in low-power hardware for wide area rapid object detection. The vast majority of saliency algorithms are quantitatively evaluated on the pre-attentive eye fixation prediction problem (see Literature Reference No. 12). That is, these methods are proved to detect salient objects in images by predicting where humans will focus their attention in test images. However, in such scenarios, the human is shown a single image (so no motion cues can be leveraged), and there is typically only a single salient object that covers the majority of image pixels. In wide-area object detection, there can be multiple objects of interest at many different scales, so it is important not just to develop a saliency map, but also to generate bounding boxes around multiple salient objects.

Computer vision-based saliency algorithms contain operations such as SIFT (scale-invariant feature extraction (see Literature Reference No. 9)), or estimation of plane geometry, that, while straightforward to implement in (serial) software, are infeasible to implement in custom analog or digital low-power hardware optimized for parallel computation. Spectral saliency algorithms typically apply a spectral transformation on a whole image, which require a huge number of input pixels to be processed in a very large circuit with many hardware multiplications.

Thus, a continuing need exists for a system of wide area rapid object detection that can be implemented in low-power hardware.

SUMMARY OF INVENTION

The present invention relates to a system for salient object detection and, more particularly, to a system for salient object detection that can be implemented in efficient hardware. The system comprises one or more processors and a memory having instructions such that when the instructions are executed, the one or more processors perform multiple operations. From each consecutive pair of image frames of a set of input image frames, an image channel comprising at least one difference in intensity between the pair of image frames is generated. To each image channel, a patch-based spectral operation is applied to overlapping image patches of the image channel, generating salient patches. Saliency patches are combined into a saliency map for each image channel, resulting in a plurality of saliency maps. The plurality of saliency maps are combined into an aggregate saliency map comprising a plurality of pixels. Using the aggregate saliency map, one or more salient objects are identified on a display.

In another aspect, the image channels are resized into multiple image scales that specify a relative size of at least one salient object in the pair of image frames, resulting in resized image channels.

In another aspect, an adaptive threshold is applied to the aggregate saliency map to determine which pixels in the aggregate saliency map correspond to at least one detected salient object region including a salient object.

In another aspect, an object bounding box is generated for each salient object, and each object bounding box is output to the display.

In another aspect, hardware-optimized serial bounding box extraction is used to generate each object bounding box and determine a set of coordinates for each object bounding box.

In another aspect, the patch-based spectral operation is a Walsh-Hadamard transform (WHT) for spectral saliency.

In another aspect, overlapping image patches are combined by performing a weighted average of all of the overlapping image patches that contribute to a part of the image frame.

In another aspect, each saliency patch, having boundaries, is weighted by a two-dimensional triangular window to reduce any boundary effects at the boundaries of saliency patches.

In another aspect, the operations are implemented in hardware having inference modules.

In another aspect, the WHT is determined using only additions and subtractions.

In another aspect, for each salient patch, the patch-based spectral operation comprises a two-dimensional spectral transformation of the salient patch; a sign operation; an inverse two-dimensional spectral transformation; and a square operation.

As can be appreciated by one skilled in the art, in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5A is a table illustrating a comparison of object detection performance using whole image spectral saliency with 4× downsampling according to various embodiments of the present disclosure;

FIG. 5B is a table illustrating a comparison of object detection performance using patch-based spectral saliency with 4× downsampling according to various embodiments of the present disclosure;

FIG. 5C is a table illustrating a comparison of object detection performance using patch-based spectral saliency with 16× downsampling according to various embodiments of the present disclosure;

FIG. 8A is a table illustrating comparing WHT object detection performance using no quantization according to various embodiments of the present disclosure;

FIG. 8B is a table illustrating Discrete Cosine Transform (DCT) object detection performance using no quantization according to various embodiments of the present disclosure;

FIG. 10A is a table illustrating object detection performance with no quantization according to various embodiments of the present disclosure; and FIG. 10B is a table illustrating object detection performance with 5 bits of quantization according to various embodiments of the present disclosure.

DETAILED DESCRIPTION

Figure 1:
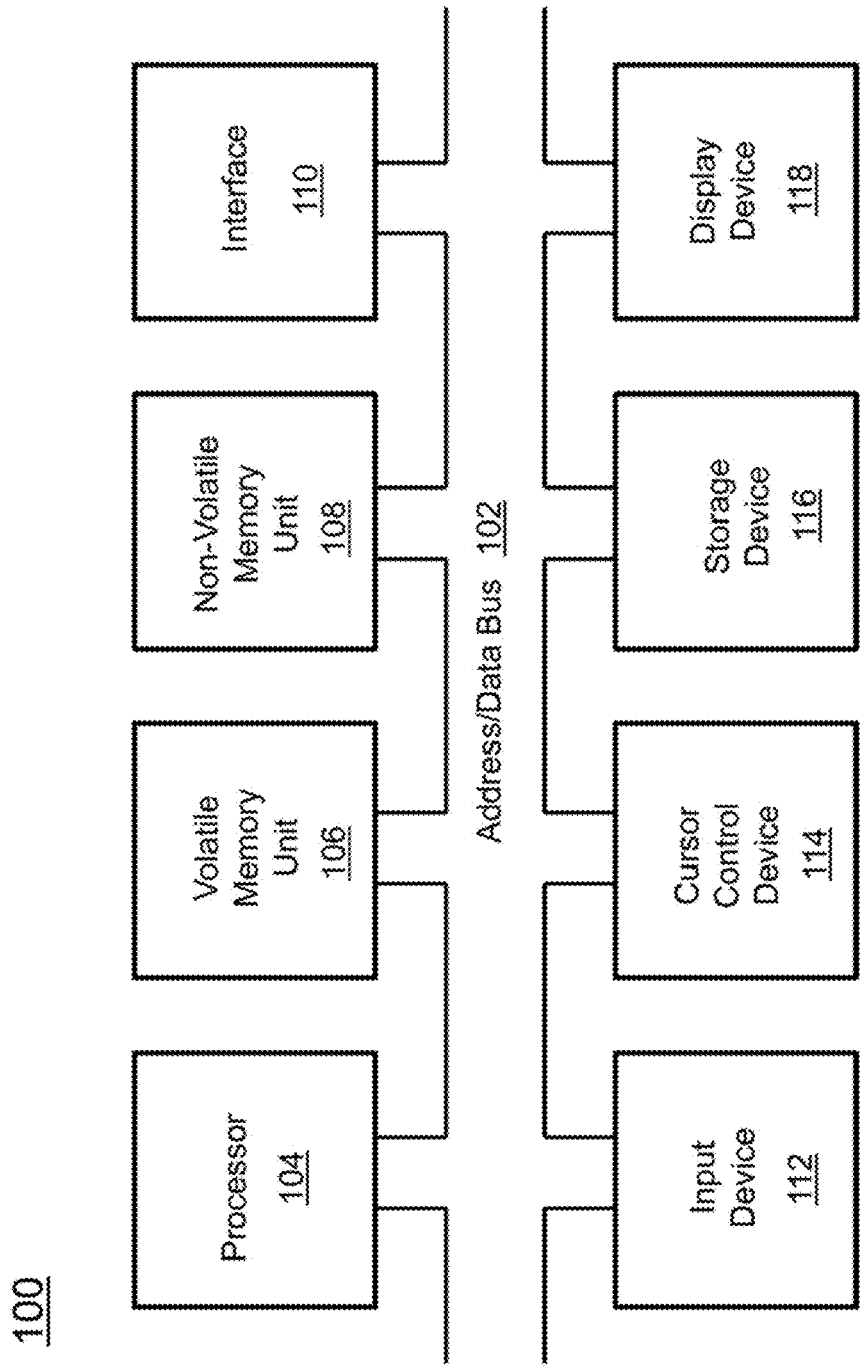
FIG. 1 is a block diagram depicting the components of a system for wide area salient object detection according to various embodiments of the present disclosure.

The present invention relates to a system for salient object detection and, more particularly, to a system for salient object detection that can be implemented in efficient hardware. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. D. Chiarulli, B. Jennings, Y. Fang, A. Seel, and S. Levitan, "A Computational Primitive for Convolution based on Coupled Oscillator Arrays," in Proc. of ISVLSI, no. 144, pp 125-130, 2015.
2. A. Fasih, J. Chedjou, and K. Kyamakya, "Ultra Fast Object Counting Based on Cellular Neural Network," in Proc. of INDS, 2008.
3. C. Guo, Q. Ma, and L. Zhang, "Spatio-temporal Saliency detection using phase spectrum of quaternion fourier transform," in Proc. of CVPR, 2008.
4. H. O. Kunz, "On the Equivalence Between One-Dimensional Discrete Walsh-Hadamard and Multidimensional Discrete Fourier Transforms," IEEE Transactions on Computers, 28 (3): 267-8, 1979.
5. X. Hou and L. Zhang, "Saliency Detection: A Spectral Residual Approach," in Proc. of CVPR, 2007.
6. X. Hou, and C. Koch, "Image Signature: Highlighting Sparse Salient Regions", IEEE TPAMI, 30(1):194-201, 2012.
7. L. Itti, C. Koch, and E. Niebur, "A model of saliency-based visual attention for rapid scene analysis," IEEE TPAMI 20(11): 1254-1259, 1998.
8. S. Levitan, Y. Fang, D. Dash, T. Shibata, D. Nikonov, and G. Bourianoff, "Non-Boolean associative architectures based on nano-oscillators," Proc. of CNNA, 2012.
9. D. Lowe, "Distinctive image features from scale-invariant keypoints," IJCV, 60(2) pp 91-110, 2004.
10. J. Mutch, and D. Lowe, "Multiclass Object Recognition with Sparse, Localized Features," in Proc. of CVPR, 2006.
11. M., Riesenhuber, and T. Poggio, "Hierarchical Models of Object Recognition in Cortex," Nature Neuroscience 2: 1019-1025, 1999.
12. B. Schauerte and R. Stiefelhagen, "Quaternion-Based Spectral Saliency Detection for Eye Fixation Prediction," in Proc. of ECCV, 2012.
13. L., Itti, "Neovision2 annotated video datasets," Stanford Hoover Tower images from the DARPA Neovision2 dataset available at http://ilab.usc.edu/neo2/dataset/.
14. R. Walczyk, A. Armitage, and T. Binnie, "Comparative Study of Connected Component Labeling Algorithms for Embedding Video Processing Systems," in Proc. of IPCV, 2010.
15. Y. Yu, J. Lin, and J. Yang, "Bottom-Up Visual Saliency Using Binary Spectrum of Walsh-Hadamard Transform," in Proc. of ICONIP, 2014.

(2) PRINCIPAL ASPECTS

Various embodiments of the invention include three "principal" aspects. The first is a system for salient object detection. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM ("EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
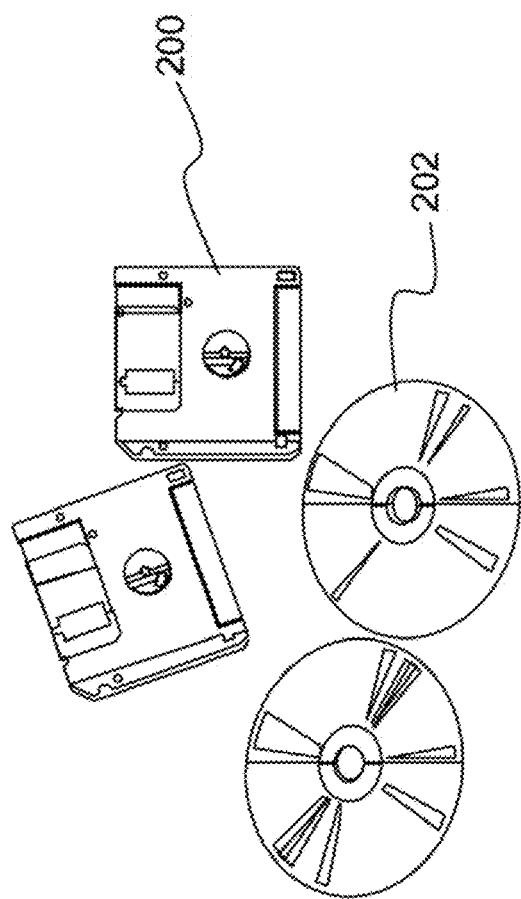
FIG. 2 is an illustration of a computer program product according to various embodiments of the present disclosure.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments of the Invention

Described is an object detection system that can be used to detect multiple salient objects of interest, such as cars, trucks, buses, persons and cyclists, in a sequence of wide-area video image frames taken from a stationary camera and output the bounding boxes of detect objects to a display (e.g., computer monitor, touchscreen). The system according to embodiments of the present disclosure finds salient objects by applying an efficient spectral transform to find salient object features that differ from smooth and periodically textured regions. The algorithms and modules have been designed to be implementable in low-power hardware, in particular, recently developed emerging device hardware, such as spiking circuits and coupled oscillators, that are capable of rapidly performing parallel operations that approximate "degree-of-match", inner products, convolution, and filtering using very little power.

Some embodiments of the system include one or more of several innovations that improve upon conventional software object detection pipeline that enable efficient (i.e., low-power and low circuit complexity) implementation in hardware. The spectral transformation according to various embodiments of the present disclosure is applied on an overlapping grid of small (64×64 pixels) local patches in the image, instead of on the whole image at one time. This reduces the number of inputs needed in the spectral saliency circuit by a factor of 30 (i.e., 30×). To mitigate the reduction in detection performance induced by operating on local patches, object detection is performed at two different scales (e.g., 4× and 16× downsampling, respectively), and the saliency responses from overlapping patches are combined using two-dimensional (2-D) triangular windows that reduce boundary effects at the boundary (or edge) of patches.

The Fourier and discrete cosine transforms used in conventional spectral-based saliency methods are replaced with the Walsh-Hadamard Transform, which has the same O(N log N) complexity as the other spectral transformations, but requires only real-valued additions and subtractions instead of complex-valued multiplications, does not require storage of any transform coefficients, and yet achieves comparable object detection performance to saliency methods based on these other spectral transformations.

A hardware-optimized serial bounding box extraction algorithm was developed that is far simpler than conventional approaches based on connected component analysis, and more computationally and power efficient than approaches based on filtering and spatial propagation on information, such as that described in Literature Reference No. 2. To ensure that the performance of the hardware implementation of the object detection pipeline according to various embodiments of the present disclosure will match software simulations, careful modeling of the effect of quantization and limited precision computation and storage at all stages of the pipeline is performed, showing that with very few bits for computation and storage (5-10 bits per module), one can maintain effective object detection performance.

The object detection system described herein comprises a camera, an image processing pipeline, and a display. The image processing pipeline has multiple possible embodiments. It can be implemented in software on a digital computer, or mapped to conventional electronic hardware either by using a field-programmable gate array (FPGA) or by making a custom application-specific integrated circuit (ASIC). However, to minimize the power consumed by the system, several modules in the image processing pipeline are designed such that the computations can be performed using specialized low-power hardware circuits referred to as inference modules. Inference modules are based on non-traditional phenomena, such as coupled oscillators, and are capable of performing "degree-of-match", "inner product", "convolution", and/or "filtering" computations. Some non-limiting examples of inference modules are described in Literature Reference No. 1 as well as U.S. application Ser. Nos. 15/043,478, 15/079,899, and 15/203,596, which are hereby incorporated by reference as though fully set forth herein).

(3.1) Overall System Architecture

Figure 3:
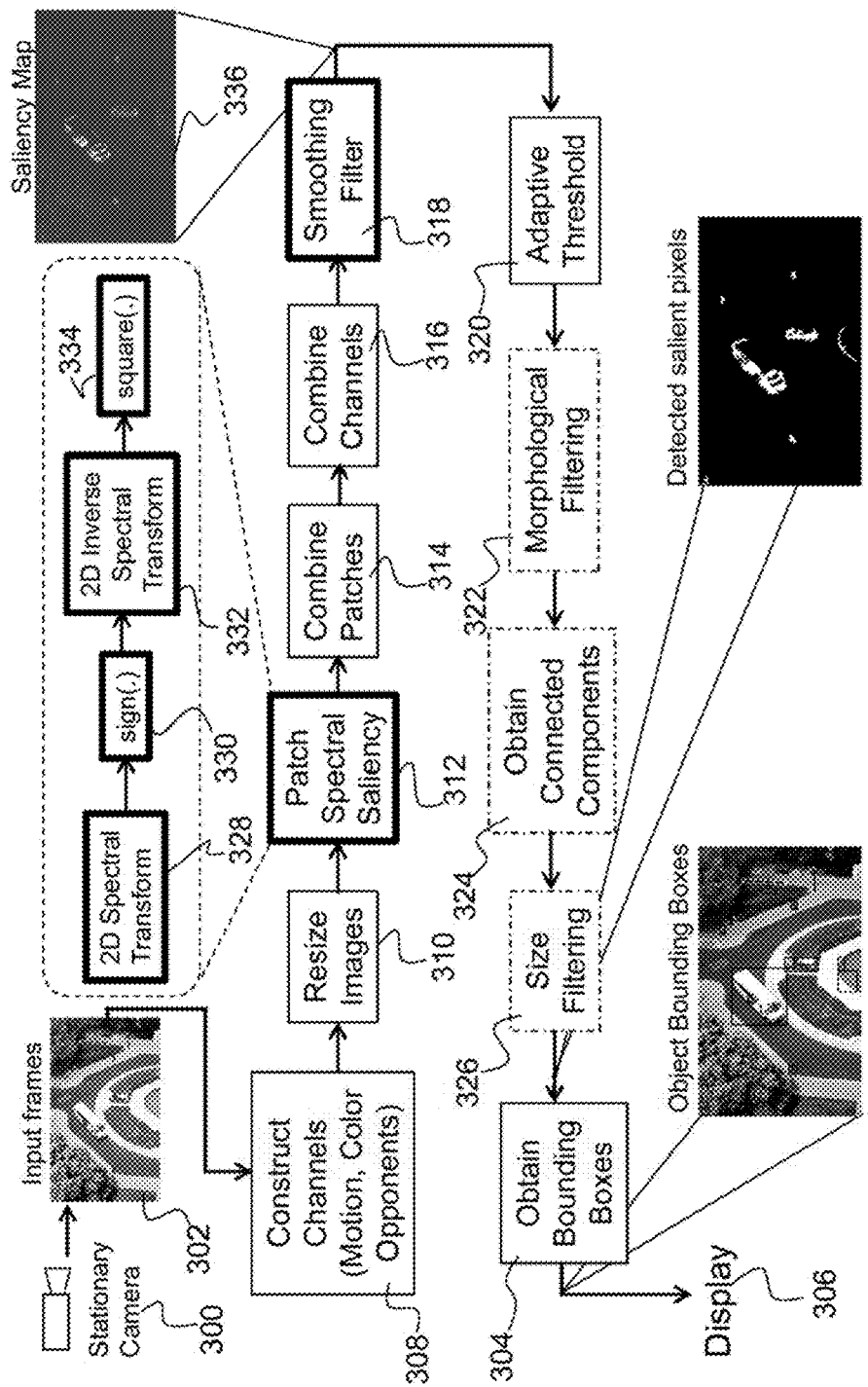
FIG. 3 is an illustration of a low-power object detection system according to various embodiments of the present disclosure.

FIG. 3 illustrates the overall system architecture, consisting of a stationary camera 300 that captures input image frames 302 and maps them to a set of detected object bounding boxes 304 that are output on a display 306. The pipeline includes one or more of the following operations/modules.

(1) Construct Channels (element 308)
From each consecutive pair of RGB (red, green, blue) image frames, the system constructs one or more of four channels including the usual three "color opponents" used in bio-inspired computer vision (red-green, blue-yellow, and intensity) were constructed (as described in Literature Reference No. 3), as well as a motion channel consisting of the difference in intensity between the two consecutive frames.

(2) Resize Images (element 310)
The one or more image channels are resized into one or multiple scales that specify the relative size of the objects of interest. In the image processing pipeline, it was found that using two scales with downsampling factors of 4× and 16×, respectively, provides adequate performance while keeping the number of required circuit components sufficiently small.

Figure 4:
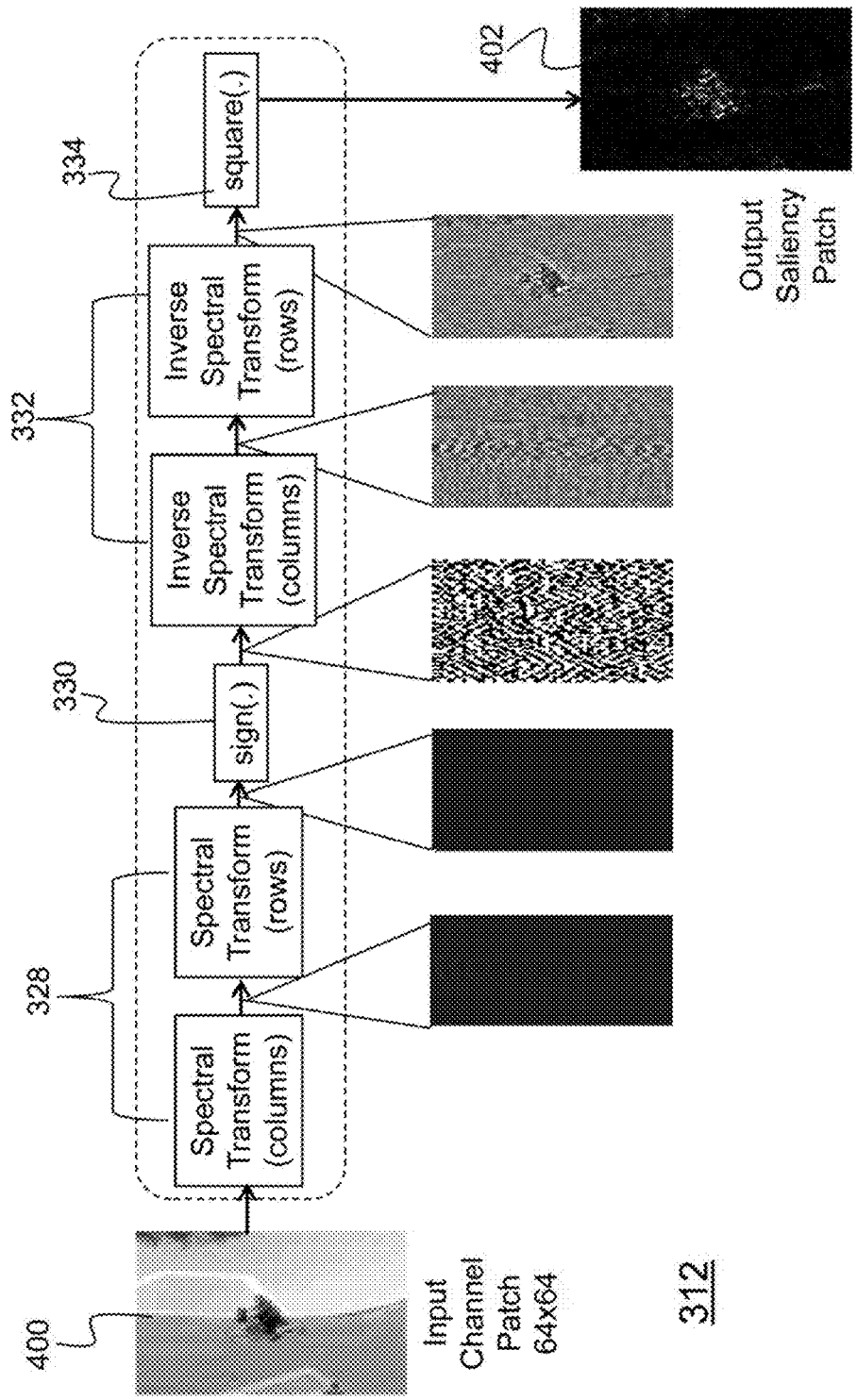
FIG. 4 is an illustration of an application of patch spectral saliency module to an example 64×64 intensity image according to various embodiments of the present disclosure.

(3) Apply Patch-based Spectral Saliency (element 312)
To each resized image channel, a spectral saliency operation is applied to a grid of overlapping patches that tile the image that highlights the saliency pixels in the patch. As shown in FIG. 4, the spectral saliency operation includes the following steps:
1. A 2-D spectral transformation of the patch is performed (or equivalently a 1-D spectral transformation performed on all columns of the patch followed by a 1-D spectral transformation performed on all rows of the patch) (element 328).
2. A "sign" operation is performed that maps all positive values to +1, all negative values to −1, and zero values to 0 (element 330).
3. An inverse 2-D spectral transformation is performed (element 332).
4. A square operation is performed (element 334).
In one embodiment, the system described herein uses, as the spectral transformation, the Walsh-Hadamard transform, which is described in detail below.

(4) Combine Patches (element 314)
The saliency responses from overlapping patches are combined in a weighted sum, where each contribution is weighted by its distance from its respective patch center.

(5) Combine Channels (element 316)
The saliency maps from each image channel are combined into one aggregate saliency map via weighted averaging.

(6) Apply Smoothing Filter (element 318)
The raw saliency maps detect aperiodic salient edges (or boundaries). To turn these into salient object regions, the raw combined saliency map is smoothed with a simple 5×5 Gaussian filter.

(7) Apply Adaptive Threshold (element 320)
To determine which pixels in the saliency map correspond to salient objects, a simple adaptive threshold is applied that marks a pixel as part of a detected object if its saliency value is greater than three times the average value in the saliency map.

(8) Apply Size and Morphological Filtering (elements 322, 324, and 326)
To prune out regions that almost surely do not correspond to objects of interest, detected object regions are filtered based on simple size-based and morphological filtering. Specifically, regions with a number of pixels that is too small or too large, and thin regions where the number of pixels divided by the bounding box area is below a threshold are filtered out. Simple morphological operations, such as erosion and dilation, are also used to further prune regions.

(9) Generate Bounding Boxes (element 304)
A simple serial algorithm is used to determine the coordinates of the bounding box of each detected salient object region. These bounding box coordinates are the input to the back end.

In FIG. 3, modules 304, 308, 310, 314, 316, and 320 (unbolded solid lines) can be implemented in hardware with relatively simple circuitry. Modules 312, 318, 320, 328, 330, 332, and 334 (bolded solid lines) contain computations that are compatible with inference modules (e.g., convolutions, inner products, or degree-of-match). Modules 322, 324, and 326 (dashed lines) contain operations that are not compatible with inference modules, because the operations rely on global features in the image, and are fundamentally serial in nature. Below is a description of an algorithmic implementation of modules 322, 324, and 326 (bounding box detection and size/morphology-based filter) that can be mapped to serial low-power FPGA (field-programmable gate array) or digital CMOS (complementary metal-oxide-semiconductor) hardware. Additionally, a description of innovations in the object detection image processing pipeline architecture according to various embodiments of the present disclosure that enable its realization on low-power hardware is provided below.

(3.1) Patch-Based Saliency (Element 312)

Spectral methods for finding salient regions in images operate by first applying a 2-D spectral transform (element 328), such as the Fourier or discrete cosine transform. The spectral transform concentrates the energy of the signal in the low frequency components. The amplitude of the spectrum does not contain much information for saliency, so in the spectral domain, a suitable operation is to remove the amplitude in the spectral domain (e.g., taking the phase of the Fourier Transform or the sign of the discrete cosine transform (DCT)) (element 330). Spectral methods then apply a corresponding 2-D inverse spectral transform (element 332), and, finally, square the result (element 334) to obtain a raw saliency map. The raw saliency map amplifies strong salient edges (boundaries) and corners while attenuating smooth regions and periodic textures.

When saliency maps from multiple color/motion channels are combined (elements 314 and 316) and then smoothed via a simple Gaussian filter (element 318), the resulting saliency map 336 can reliably highlight salient objects without training. These spectral approaches have proven to be highly effective for detecting salient objects in images, as measured by the accuracy of these methods to predict pre-attentive gaze (see Literature Reference Nos. 3, 6, and 12). Spectral saliency methods are also efficient to implement in software, owing to the separable nature of 2-D spectral transforms, and their O(N log N) computational complexity. However, it is infeasible to implement a spectral transform in low-power hardware that is applied to a whole image because of the extremely large number of inputs required for the circuit. For example, for a 1088×1920 pixel high definition (HD) image frame from the Stanford Tower dataset (see Literature Reference No. 13), applying a whole image spectral transform even to the image downsampled by a factor of 4× would require 130,560 input pixels in the circuit.

As applied to FIG. 4, to reduce the required hardware complexity of the patch spectral saliency module (element 312), a spectral transform (element 328) is applied to overlapping local patches (e.g., input channel patch 400) of pixel size 64×64, as illustrated in FIG. 4, to generate an output saliency patch 402. The number of inputs required to process a single patch is, thus, reduced to 4096, and the same circuit can be used repeatedly in a serial fashion to process a whole image. Other embodiments may use patches having larger or smaller pixel sizes, which may be based on the hardware limitations of a corresponding system.

The effectiveness of the spectral saliency method is largely because it is able to capture long-range spatial correlations in the image, thus replacing the whole image spectral transform with patch-level spectral transforms does cause a reduction in performance, as shown in the tables in FIGS. 5A-5C. In particular, using local patches for saliency causes no single scale to be sufficient to reliably detect all of the object classes of interest. This necessitates the use of multiple image scales for object detection. It has been found empirically that combining the saliency results from two scales (with downsampling factors of 4× and 16×, respectively) provides comparable performance to a spectral transform performed on the whole image.

The tables depicted in FIGS. 5A-5C show comparison object detection performance (hit/miss rate, false detection rate, average/median overlap ratios) of five object classes using whole image spectral transforms and patch-based spectral transforms on a representative subset of 3670 frames of the Stanford Tower dataset (see Literature Reference No. 13). The table in FIG. 5A illustrates whole image spectral saliency with 4× downsampling. FIG. 5B illustrates 64×64 patch-based spectral saliency with 4× downsampling. FIG. 5C illustrates 64×64 patch-based spectral saliency with 16× downsampling.

Figure 6:
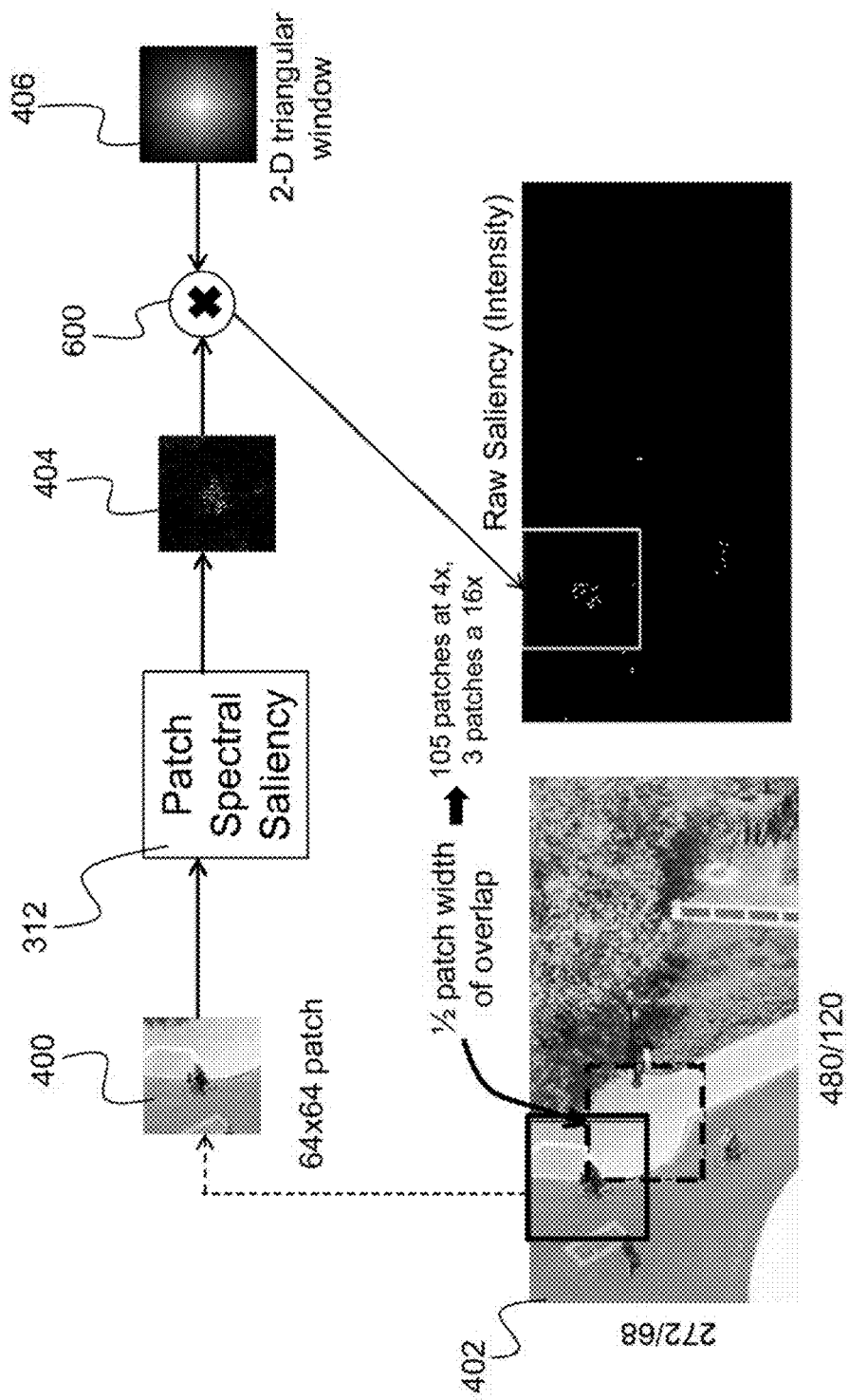
FIG. 6 illustrates a scheme for combining overlapping saliency patches into a raw saliency map for a whole image according to various embodiments of the present disclosure.

Using local patches for saliency introduces distortions near the boundaries of each patch. As depicted in FIG. 6, to mitigate this, patch-based spectral saliency (element 312) may be performed on an overlapping grid of patches (e.g., 400) of an input image 402, where the overlap factor is ½. Each pixel output of the patch-based spectral saliency module (element 312) is multiplied (element 600) by the corresponding pixel in the 2-D triangular window (element 406). Other embodiments may have larger or smaller overlap factors, which may range between ¼ and ¾. The contributions of overlapping patches are combined by performing a weighted average of all the overlapping patches that contribute to a part of an image 402. In an embodiment, each saliency patch 404 is weighted by a 2-D triangular window 406, so that saliency values closer to the center of the patch are given higher weight than saliency values at the boundary (that are distorted due to the small patch size).

(3.2) Walsh-Hadamard Transform for Spectral Saliency

Figures 7A, 7B:
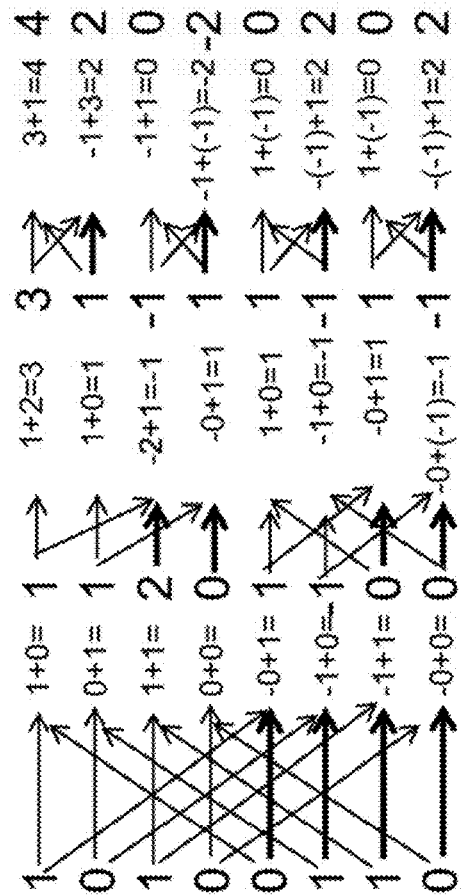
FIG. 7A illustrates a Walsh-Hadamard (WHT) matrix of size 8 according to prior art.
FIG. 7B illustrates a WHT applied to an example 8-D vector, computed using a butterfly pattern similar to the Fast Fourier Transform (FFT) according to prior art.

In the object detection pipeline according to various embodiments of the present disclosure, the discrete cosine transform used in Literature Reference No. 6 was replaced with the Walsh-Hadamard transform (WHT), as suggested in Literature Reference No. 15. As illustrated in FIG. 7A, the WHT is equivalent to a multi-dimensional discrete Fourier transform (DFT) of size $2^n$, and looks surprisingly similar to the DCT matrix if all the coefficients have been quantized to a single bit (as the signum function performs). As all of the coefficients of the WHT are +1 or −1, the WHT can be computed using only additions and subtractions (i.e., no multiplications required). Furthermore, the WHT matrix $H_m$ of order m can be constructed recursively from $H_{m-1}$ as:

$$H_m = \frac{1}{\sqrt{2}} \begin{bmatrix} H_{m-1} & H_{m-1} \\ H_{m-1} & -H_{m-1} \end{bmatrix},$$

so that the computation can be implemented with a butterfly pattern very similar to the FFT (Fast Fourier Transform) butterfly, as depicted in FIG. 7B. Thus, for a vector of size N, the WHT can be computed with only O(N log N) real-valued additions/subtractions. The performance of the WHT and DCT transformed using the 3670 representative frame sequence were compared, with no quantization. FIGS. 8A and 8B depict a comparison of WHT (FIG. 8A) and DCT (FIG. 8B) performance (hit/miss rate, false detection rate, average/median overlap ratios) on a representative set of 3670 frames from the Stanford Tower stationary camera dataset (see Literature Reference No. 13) using no quantization. As shown, the WHT (FIG. 8A) provides comparable detection performance to DCT (FIG. 8B) for object detection despite its greatly reduced computational and storage requirements. The WHT (FIG. 8A) transform produces more false alarms, but it also makes more correct detections that have more accurate bounding boxes.

(3.3) Sequential Bounding Box Algorithm

Bounding boxes are the glue in many image processing pipelines between the object detection system and subsequent object recognition. However, the computation of bounding boxes is fundamentally non-local and serial in nature, and, thus, is neither straightforward nor efficient to extract bounding boxes using inference module-based filtering. For example, the authors of Literature Reference No. 2 developed a cellular neural network (CNN)-based approach to obtain bounding boxes based on applying "shadowing" filter operations that propagate information around spatially in the image. These shadowing operations require time proportional to the height or width of the image to complete, and extract a single region at a time. Thus, the hardware-compatible and power-efficient approach for bounding box generation according to various embodiments of the present disclosure is a sequential object counting, such as that described by Literature Reference No. 14.

Figure 9A:
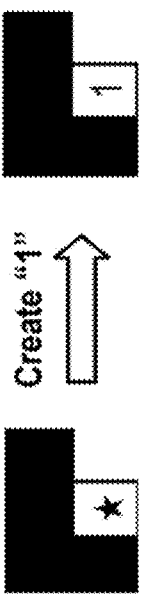
FIG. 9A is an illustration of a raster scan of pixels of a binary detection map using a sequential bounding box algorithm when none of the pixels are salient pixels according to various embodiments of the present disclosure.
Figure 9B:
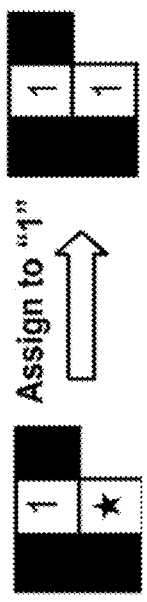
FIG. 9B is an illustration of a raster scan of pixels of a binary detection map using a sequential bounding box algorithm if at least one of the neighbor pixels are salient according to various embodiments of the present disclosure.
Figure 9C:
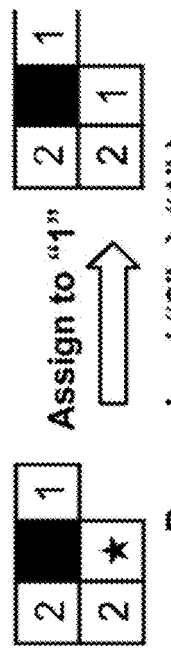
FIG. 9C is an illustration of a raster scan of pixels of a binary detection map using a sequential bounding box algorithm if two neighbors have different labels according to various embodiments of the present disclosure.

The sequential algorithm operates by scanning the pixels of the binary detection map in raster scan order while constructing a 'label' map that stores the label of each connected region. For each pixel, its upper-left, upper, upper-right, and right neighbors are examined, as illustrated in FIGS. 9A-9C. If none of them are salient pixels, then the region counter is updated by one, and a new bounding box containing only the current pixel is created, the current region count as a label (FIG. 9A). If at least one of the neighbor pixels are salient, then the label of the current pixel is set to the minimum label of the neighbors, and that bounding box is updated accordingly (FIG. 9B). If two neighbors have different labels, then a region-merging table is updated to specify that they should be merged (FIG. 9C).

After all of the pixels have been scanned, they go through the region merging table in descending order, merging each region with the smallest label it is adjacent to. This process uses only a single pass through the detection map and requires as auxiliary store two rows of numbers to store the 'label' map, and a N×5 array of numbers to store the bounding box parameters, where N should be a maximum region count that can be accommodated. This approach is efficient, both in power and hardware complexity because it requires only a single pass through the detection map. In addition, with constraints on the maximum object size, this approach can be partially parallelized by breaking the image into smaller blocks and then combining the intermediate block results together.

(3.4) Modeling of Effects of Quantization

Quantization, or limited precision computation and storage of data, can affect the object detection pipeline depicted in FIG. 3 at several stages, including after loading images, after constructing image channels, after channel resizing, in between the one-dimensional (1-D) forward and inverse spectral transforms, after combining the saliency channels, and after applying the post spectral transform smoothing filter. Modeling quantization effects on detection performance is very important for developing low-power hardware, because the number of bits used for computation and storage greatly affects power consumption.

Quantization was introduced into the software simulation of the object detection system according to various embodiments of the present disclosure at each of the above stages by rounding the output of a given module to a certain number of bits. Five bits of quantization were used for each stage, with the exception of the spectral saliency module, where ten bits of quantization were used, and the post-transform smoothing filter, where eight bits of quantization were used. The detection performance of the object detection pipeline described herein was compared with and without quantization. As the results in FIGS. 9A and 9B show, quantization does degrade the detection performance (both in number of correct detections and quality of detections), but also significantly reduces the number of false detections.

The invention described herein is applicable to unmanned autonomous vehicles and platforms that have severely limited SWAP (size, weight, and power). By performing rapid detection of mission-relevant targets and obstacles on hardware near the sensor, the system improves mission responsiveness and reduces the amount of raw sensor data that must be transmitted over constrained communication bandwidths. The system according to various embodiments of the present disclosure will also be of use in both active vehicle and autonomous driving applications. By performing object detection in a low-power, low-cost hardware near the camera, a vehicle (e.g., automobile) can more rapidly and robustly detect obstacles in the road, and thus provide more timely warnings to the driver, or more prompt automated response to obstacles in autonomous vehicles.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for salient object detection, the system comprising:
   one or more processors and a non-transitory computer-readable medium having executable instructions encoded thereon such that when executed, the one or more processors perform operations of:
   from each consecutive pair of image frames of a set of input image frames, generating an image channel comprising at least one difference in intensity between the pair of image frames;
   to each image channel, applying a patch-based spectral operation to overlapping image patches of the image channel, generating salient patches wherein each saliency patch, having boundaries, is weighted by a two-dimensional triangular window to reduce any boundary effects at the boundaries of saliency patches;
   combining saliency patches into a saliency map for each image channel, resulting in a plurality of saliency maps;
   combining the plurality of saliency maps into an aggregate saliency map comprising a plurality of pixels; and
   using the aggregate saliency map, identifying one or more salient objects on a display.

2. The system as set forth in claim 1, wherein the one or more processors further perform an operation of resizing the image channels into multiple image scales that specify a relative size of at least one salient object in the pair of image frames, resulting in resized image channels.

3. The system as set forth in claim 1, wherein the one or more processors further perform an operation of applying an adaptive threshold to the aggregate saliency map to determine which pixels in the aggregate saliency map correspond to at least one detected salient object region including a salient object.

4. The system as set forth in claim 1, wherein the one or more processors further perform an operation of generating an object bounding box for each salient object and outputting each object bounding box to the display.

5. The system as set forth in claim 1, wherein hardware-optimized serial bounding box extraction is used to generate each object bounding box and determine a set of coordinates for each object bounding box.

6. The system as set forth in claim 1, wherein the patch-based spectral operation is a Walsh-Hadamard transform (WHT) for spectral saliency.

7. The system as set forth in claim 1, wherein overlapping image patches are combined by performing a weighted average of all of the overlapping image patches that contribute to a part of the image frame.

8. The system as set forth in claim 1, wherein the operations are implemented in hardware having inference modules.

9. The system as set forth in claim 6, wherein the WHT is determined using only additions and subtractions.

10. The system as set forth in claim 1, wherein for each salient patch, the patch-based spectral operation comprises:
a two-dimensional spectral transformation of the salient patch;
a sign operation;
an inverse two-dimensional spectral transformation; and
a square operation.

11. A computer implemented method for salient object detection, the method comprising an act of:
causing one or more processors to execute instructions encoded on a non-transitory computer-readable medium, such that upon execution, the one or more processors perform operations of:
from each consecutive pair of image frames of a set of input image frames, generating an image channel comprising at least one difference in intensity between the pair of image frames;
to each image channel, applying a patch-based spectral operation to overlapping image patches of the image channel, generating salient patches, wherein each saliency patch, having boundaries, is weighted by a two-dimensional triangular window to reduce any boundary effects at the boundaries of saliency patches;
combining saliency patches into a saliency map for each image channel, resulting in a plurality of saliency maps;
combining the plurality of saliency maps into an aggregate saliency map comprising a plurality of pixels; and
using the aggregate saliency map, identifying one or more salient objects on a display.

12. The method as set forth in claim 11, wherein the one or more processors further perform an operation of resizing the image channels into multiple image scales that specify a relative size of at least one salient object in the pair of image frames, resulting in resized image channels.

13. The method as set forth in claim 11, wherein the one or more processors further perform an operation of applying an adaptive threshold to the aggregate saliency map to determine which pixels in the aggregate saliency map correspond to at least one detected salient object region including a salient object.

14. The method as set forth in claim 11, wherein the one or more processors further perform an operation of generating an object bounding box for each salient object and outputting each object bounding box to the display.

15. The method as set forth in claim 11, wherein hardware-optimized serial bounding box extraction is used to generate each object bounding box and determine a set of coordinates for each object bounding box.

16. The method as set forth in claim 11, wherein the patch-based spectral operation is a Walsh-Hadamard transform (WHT) for spectral saliency.

17. The method as set forth in claim 11, wherein overlapping image patches are combined by performing a weighted average of all of the overlapping image patches that contribute to a part of the image frame.

18. The method as set forth in claim 11, wherein the operations are implemented in hardware having inference modules.

19. The method as set forth in claim 16, wherein the WHT is determined using only additions and subtractions.

20. The method as set forth in claim 11, wherein for each salient patch, the patch-based spectral operation comprises:
a two-dimensional spectral transformation of the salient patch;
a sign operation;
an inverse two-dimensional spectral transformation; and
a square operation.

21. A computer program product for salient object detection, the computer program product comprising:
a non-transitory computer-readable medium having executable instructions encoded thereon, such that upon execution of the instructions by one or more processors, the one or more processors perform operations of:
from each consecutive pair of image frames of a set of input image frames, generating an image channel comprising at least one difference in intensity between the pair of image frames;
to each image channel, applying a patch-based spectral operation to overlapping image patches of the image channel, generating salient patches, wherein each saliency patch, having boundaries, is weighted by a two-dimensional triangular window to reduce any boundary effects at the boundaries of saliency patches;
combining saliency patches into a saliency map for each image channel, resulting in a plurality of saliency maps;
combining the plurality of saliency maps into an aggregate saliency map comprising a plurality of pixels; and
using the aggregate saliency map, identifying one or more salient objects on a display.

22. The computer program product as set forth in claim 21, further comprising instructions for causing the one or more processors to further perform an operation of resizing the image channels into multiple image scales that specify a relative size of at least one salient object in the pair of image frames, resulting in resized image channels.

* * * * *